(12) United States Patent
Tanuma

(10) Patent No.: US 10,754,472 B2
(45) Date of Patent: Aug. 25, 2020

(54) TOUCH SENSOR DEVICE AND CAPACITANCE CALIBRATION METHOD

(71) Applicant: KABUSHIKI KAISHA TOKAI RIKA DENKI SEISAKUSHO, Aichi (JP)

(72) Inventor: Kazuhiro Tanuma, Aichi (JP)

(73) Assignee: KABUSHIKI KAISHA TOKAI RIKA DENKI SEISAKUSHO (JP)

( * ) Notice: Subject to any disclaimer, the term of this patent is extended or adjusted under 35 U.S.C. 154(b) by 21 days.

(21) Appl. No.: 16/283,111

(22) Filed: Feb. 22, 2019

(65) Prior Publication Data
US 2019/0265836 A1    Aug. 29, 2019

(30) Foreign Application Priority Data

Feb. 27, 2018   (JP) ................. 2018-033764

(51) Int. Cl.
*G06F 3/041* (2006.01)
*G06F 3/044* (2006.01)
*B60K 35/00* (2006.01)

(52) U.S. Cl.
CPC ............ *G06F 3/0418* (2013.01); *B60K 35/00* (2013.01); *G06F 3/044* (2013.01); *B60K 2370/143* (2019.05)

(58) Field of Classification Search
CPC ....... G06F 3/0418; G06F 3/044; B60K 35/00; B60K 2370/143
USPC .......................................... 324/686; 345/174
See application file for complete search history.

(56) References Cited

U.S. PATENT DOCUMENTS

| 6,661,239 | B1 * | 12/2003 | Ozick ................. | G01D 5/2405 324/658 |
| 7,830,160 | B2 * | 11/2010 | Philipp .................. | G06F 3/044 324/686 |
| 8,363,033 | B2 * | 1/2013 | Chen ....................... | G06F 3/044 178/18.06 |
| 9,823,327 | B2 * | 11/2017 | Tanaka .................... | G06F 3/044 |
| 10,073,574 | B2 * | 9/2018 | Otagaki .................. | G06F 3/044 |
| 10,108,293 | B2 * | 10/2018 | Imai ....................... | G06F 3/0418 |

FOREIGN PATENT DOCUMENTS

JP     2010257046 A    11/2010

* cited by examiner

*Primary Examiner* — Reena Aurora
(74) *Attorney, Agent, or Firm* — Taroli, Sundheim, Covell & Tummino LLP

(57) ABSTRACT

A touch sensor device includes a calibration processor that calibrates capacitance of each of a plurality of capacitance sensors. The calibration processor calculates an initial calibration value when the touch sensor device is activated, and maintains the initial calibration value when a calibrated capacitance calculated with the initial calibration value exceeds a touch determination threshold value. If the calibrated capacitance calculated with the initial calibration value does not exceed the touch determination threshold value even after a specified period elapses subsequent to calculation of the initial calibration value, the calibration processor obtains a value equal to or approximate to a minimum value of the capacitance that changes in accordance with a re-touch as a recalibration value when the calibrated capacitance represents an anomaly of the initial calibration value.

6 Claims, 4 Drawing Sheets

TOUCH SENSOR DEVICE AND CAPACITANCE CALIBRATION METHOD

CROSS-REFERENCE TO RELATED APPLICATIONS

This application is based upon and claims the benefit of priority from prior Japanese Patent Application No. 2018-033764, filed on Feb. 27, 2018, the entire contents of which are incorporated herein by reference.

FIELD

The following description relates to a touch sensor device that detects a touch operation performed by a user and a method for calibrating capacitance.

DESCRIPTION OF RELATED ART

A capacitive touch sensor device detects a touch operation based on change in capacitance. In principle, the capacitive touch sensor device cannot distinguish whether the change in capacitance occurs because of a touch operation performed by a user or parasitic capacitance resulting from a change or the like in the humidity or temperature. Accordingly, the conventional touch sensor device is configured to detect capacitance in a non-touched state and define the capacitance detected in the non-touched state as the parasitic capacitance. The parasitic capacitance is then used to offset the detected capacitance (refer to Japanese Laid-Open Patent Publication No. 2010-257046).

The touch sensor device may be activated while a touchscreen is being touched. In such a case, the detected capacitance will include the change in capacitance resulting from the user touching the touchscreen in addition to the parasitic capacitance. In such a case, the capacitance cannot be calibrated accurately.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a touch sensor device includes a plurality of capacitance sensors, a calibration processor that calibrates capacitance detected by each of the capacitance sensors and calculates a calibrated capacitance, and a touch monitoring unit that monitors whether the calibrated capacitance exceeds a touch determination threshold value. The calibration processor calculates an initial calibration value when the touch sensor device is activated, maintains the initial calibration value when the calibrated capacitance that is calculated with the initial calibration value exceeds the touch determination threshold value, determines whether the calibrated capacitance changed by a re-touch represents anomaly of the initial calibration value when the calibrated capacitance calculated with the initial calibration value does not exceed the touch determination threshold value even after a specified period elapses subsequent to calculation of the initial calibration value, and obtains a value equal to or approximate to a minimum value of the capacitance that changes in accordance with the re-touch as a recalibration value when the calibrated capacitance represents anomaly of the initial calibration value.

In another general aspect, a method for calibrating capacitance of each of a plurality of capacitance sensors arranged in a touch sensor device includes calculating an initial calibration value when the touch sensor device is activated, calculating a calibrated capacitance by calibrating the capacitance with the initial calibration value, maintaining the initial calibration value when the calibrated capacitance calculated with the initial calibration value exceeds the touch determination threshold value, determining whether the calibrated capacitance changed by a re-touch represents anomaly of the initial calibration value when the calibrated capacitance calculated with the initial calibration value does not exceed the touch determination threshold value even after a specified period elapses subsequent to calculation of the initial calibration value, and obtaining a value equal to or approximate to a minimum value of the capacitance that changes in accordance with the re-touch as a recalibration value when the calibrated capacitance indicates anomaly of the initial calibration value.

In another general aspect, a non-transitory machine readable memory medium stores one or more programs that are executed by one or more processors. The one or more programs include instructions causing the one or more processors to execute the method described above.

In accordance with the above exemplary embodiments, the capacitance is calibrated accurately regardless of whether the touchscreen is in a touched state or a non-touched state.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

An embodiment of a touch sensor device and a method for calibrating capacitance will now be described with reference to FIGS. 1 to 5.

Figure 1:
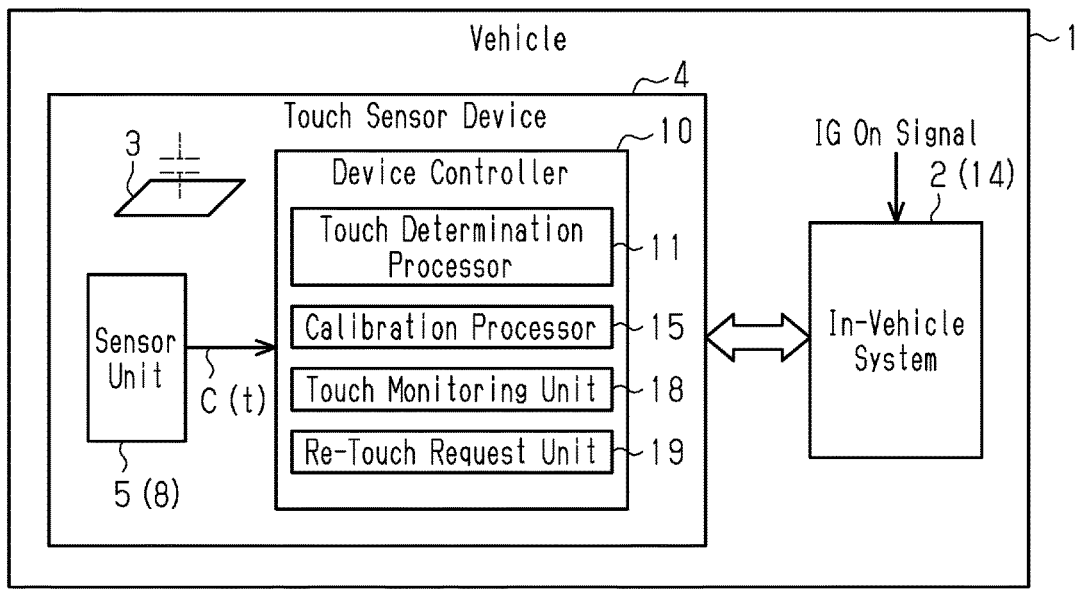
FIG. 1 is a schematic block diagram illustrating the configuration of a touch sensor device in accordance with one embodiment.

As illustrated in FIG. 1, a vehicle 1 includes an in-vehicle system 2 and a touch sensor device 4. The touch sensor device 4 includes a touchscreen 3 and detects when a user touches the touchscreen 3 (that is, touch operation of user). For example, when a user touch is detected after the electric power supply of the vehicle 1 is activated (for example, ignition (IG) is turned on), the in-vehicle system 2 permits driving of the vehicle 1. The touch sensor device 4 is a capacitive touch sensor device that detects when the user touches the touchscreen 3 based on changes in the capacitance. The touch sensor device 4, which includes a sensor unit 5, obtains the capacitance detected by the sensor unit 5 as a detected capacitance C(t). For example, the touch sensor device 4 may compare the detected capacitance C(t) with a touch determination threshold value ΔCth to determine whether or not the user touched the touchscreen 3. The touchscreen 3 may be arranged on, for example, a steering wheel or an armrest of the vehicle 1.

The sensor unit 5 includes a plurality of capacitance sensors 8. The capacitance sensors 8 are arranged over the entire back surface of the touchscreen 3 to detect changes in capacitances that is in accordance with a user touch (touched location and touching strength) on the touchscreen 3.

The touch sensor device 4 includes a device controller 10 that controls operation of the touch sensor device 4. The device controller 10 includes a touch determination processor 11 that receives the detected capacitance C(t) from the capacitance sensors 8. The touch determination processor 11 determines whether or not a user touched the touchscreen 3 based on the detected capacitance C(t). Further, the touch determination processor 11 determines the location on the touchscreen 3 touched by the user based on the detected capacitance C(t).

Figure 2:
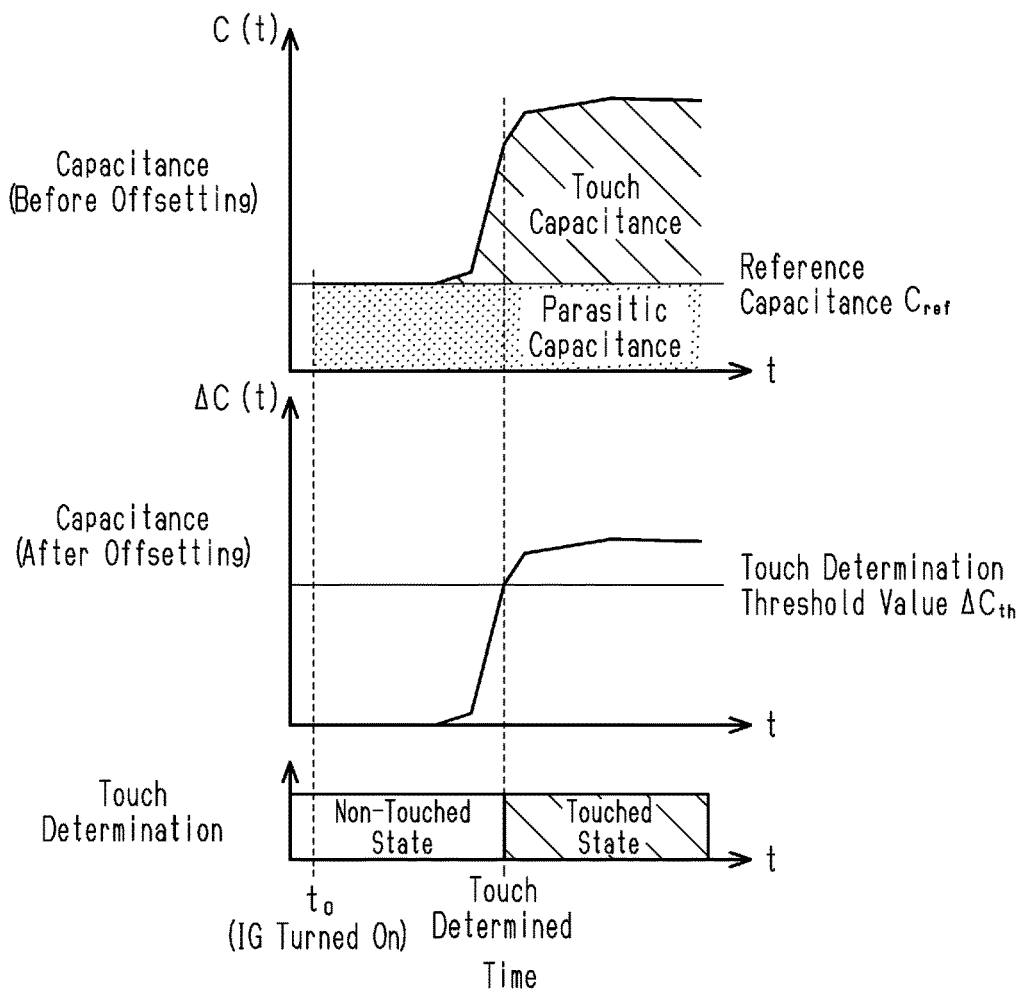
FIG. 2 is a schematic diagram illustrating an accurate calibration process correlated with changes in detected capacitance (upper graph), changes in differential capacitance (middle graph), and a touch determination process (lower graph).

As illustrated in FIG. 2 (upper graph), each capacitance sensor 8 of the touch sensor device 4 includes parasitic capacitance. The value of the parasitic capacitance varies, for example, depending on changes or the like in the humidity or temperature. The parasitic capacitance needs to be taken into consideration for accurate determination of a user touch based on the detected capacitance C(t) of the capacitance sensors 8.

Accordingly, the touch sensor device 4 includes a calibration processor 15 that calibrates the detected capacitance C(t) of the capacitance sensors 8 when a system 14, which is actuated in cooperation with the touch sensor device 4, is activated. In the present example, when the touch sensor device 4 is activated in cooperation with the system 14, the calibration processor 15 obtains the detected capacitance C(t) of each capacitance sensor 8 as a reference capacitance Cref and calibrates the detected capacitance C(t) with the reference capacitance Cref. For example, when the touch sensor device 4 is activated in cooperation with the system 14 at time $t_0$, the calibration processor 15 obtains a detected capacitance $C(t_0)$ of each capacitance sensor 8 at time $t_0$ as the reference capacitance Cref (initial calibration value, refer to upper graph in FIG. 2). The calibration processor 15 subtracts (offsets) the reference capacitance Cref from the detected capacitance C(t) of each capacitance sensor 8 to obtain a differential capacitance ΔC(t) (refer to middle graph in FIG. 2). The differential capacitance ΔC(t) corresponds to a calibrated capacitance. Subsequently, the touch sensor device 4 compares the differential capacitance ΔC(t) to the touch determination threshold value ΔCth to determine whether the touchscreen 3 is in a non-touched state or a touched state (refer to lower graph in FIG. 2).

In the present example, the system 14 is the in-vehicle system 2 that controls in-vehicle devices (for example, vehicle door lock device and engine). The system 14 is not limited to the in-vehicle system 2 and may be any system actuated in cooperation with the touch sensor device 4. The in-vehicle system 2 is activated when the electric power supply of the vehicle 1 is activated (for example, when engine switch (IG switch) near driver seat is turned on. The in-vehicle system 2 prompts the user to touch the touchscreen 3 (for example, on steering wheel or armrest) after the IG is turned on. When the touch sensor device 4 detects a user touch, the in-vehicle system 2, for example, permits driving of the vehicle 1.

When the differential capacitance ΔC(t) is greater than the touch determination threshold value ΔCth (ΔC(t)>ΔCth), the touch determination processor 11 determines that the user is touching the touchscreen 3 and that the touchscreen 3 is in the touched state. In contrast, when the differential capacitance ΔC(t) is less than or equal to the touch determination threshold value ΔCth (ΔC(t)≤ΔCth), the touch determination processor 11 determines that the user is not touching the touchscreen 3 and that the touchscreen 3 is in the non-touched state.

Figure 3:
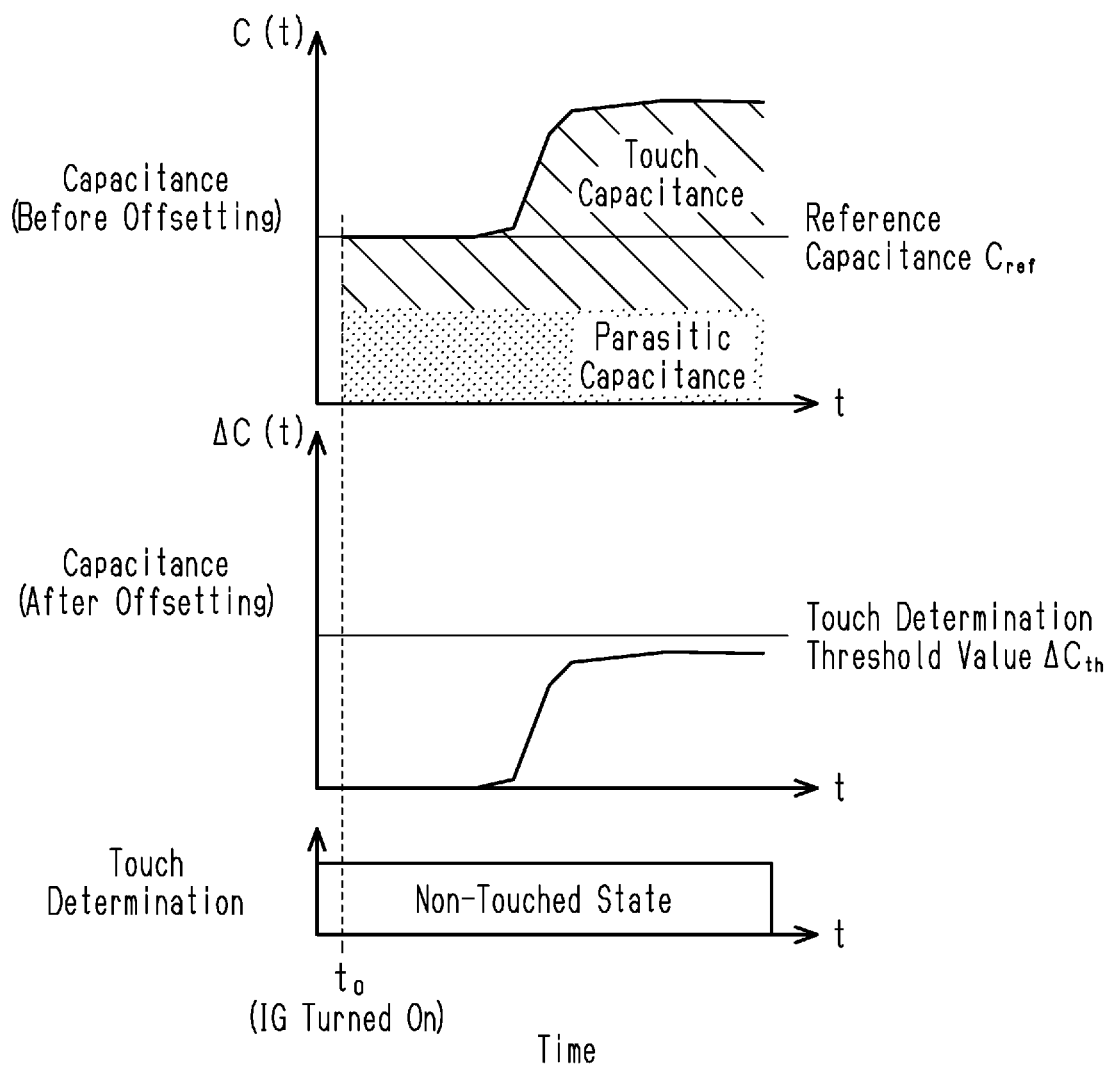
FIG. 3 is a schematic diagram illustrating an anomalous calibration process correlated with changes in detected capacitance (upper graph), changes in differential capacitance (middle graph), and the touch determination process (lower graph).

As illustrated in FIG. 3 (upper graph), the touch sensor device 4 may be activated while the touchscreen 3 is being touched. In this case, the detected capacitance C(t) obtained at time $t_0$ when the touch sensor device 4 is activated includes the change in capacitance generated by the user touch in addition to the parasitic capacitance. Thus, the actual parasitic capacitance cannot be recognized and the detected capacitance C(t) cannot be accurately calibrated. Accordingly, with the conventional calibration method, the touchscreen 3 needs to be in a non-touched state when the touch sensor device 4 is activated. That is, the calibration process is accurately performed when the touch sensor device 4 is activated in a non-touched state but not when the touch sensor device 4 is activated in a touched state. This is because, as described above, when the touch sensor device 4 is activated in a touched state, the reference capacitance Cref obtained at time $t_0$ includes the change in capacitance generated by the user touch in addition to the parasitic capacitance (refer to upper graph in FIG. 3). Therefore, the calibration process (C(t)-Cref) is anomalous (refer to middle graph in FIG. 3). As a result, even when the user touches the touchscreen 3, the touch determination process may not be able to detect the touched state (refer to middle and lower graph in FIG. 3). The touch sensor device 4 solves such a problem.

With reference to FIG. 1, the touch sensor device 4 includes a recalibration that reconfigures the reference capacitance Cref to an acceptable value even when an anomalous calibration is performed due to activation in a touched state. With the recalibration of the present example, when the system 14 is activated (i.e., touch sensor device 4 activated), the touch sensor device 4 calculates the reference capacitance Cref (initial calibration value) and then calculates the differential capacitance ΔC(t) (calibrated capacitance) by calibrating the detected capacitance C(t) with the reference capacitance Cref. Next, the touch sensor device 4 compares the differential capacitance ΔC(t) to the touch determination threshold value ΔCth. When the differential capacitance ΔC(t) is greater than the touch determination threshold value ΔCth, the touch sensor device 4 maintains the reference capacitance Cref, which is obtained as the initial calibration value. However, when the differential capacitance ΔC(t) does not exceed the touch determination threshold value ΔCth even after a specified period $t_1$ elapses subsequent to the activation of the system 14 (i.e., subsequent to calculation of the initial calibration value), the touch sensor device 4 requests the user to re-touch the touchscreen 3. Subsequently, the touch sensor device 4 monitors changes in the differential capacitance ΔC(t) to determine whether or not the initial calibration value is anomalous. When the touch sensor device 4 determines that the initial calibration value is anomalous, the touch sensor device 4 obtains a recalibration value by reconfiguring the reference capacitance Cref and recalibrates the detected capacitance C(t) with the recalibration value. The recalibration of the detected capacitance C(t) will be described later.

The touch sensor device 4 includes a touch monitoring unit 18 that monitors touching of the touchscreen 3 after the calibration processor 15 calculates the initial calibration value. The touch monitoring unit 18 is, for example, arranged in the device controller 10. After the initial calibration value is calculated, the touch monitoring unit 18 compares the differential capacitance ΔC(t) to the touch determination threshold value ΔCth and monitors whether or not the touchscreen 3 has been touched (that is, whether or not differential capacitance ΔC(t) is greater than touch determination threshold value ΔCth).

Further, the touch sensor device 4 includes a re-touch request unit 19 that requests a user to re-touch the touchscreen 3 when the touchscreen 3 has not been touched for the specified period $t_1$ after the initial calibration value is calculated (that is, after activation of touch sensor device 4). The re-touch request unit 19 is arranged, for example, in the device controller 10. For example, the re-touch request unit 19 requests the user to re-touch the touchscreen 3 with an in-vehicle device. The re-touch request may be issued, for example, through visual notification on an instrument panel, a display of a car navigation system, or the like. Alternatively, the re-touch request may be issued through an audio notification using an in-vehicle speaker or the like.

When the differential capacitance ΔC(t) is greater than the touch determination threshold value ΔCth, the calibration processor 15 maintains the initial calibration value. In contrast, when the differential capacitance ΔC(t) does not exceed the touch determination threshold value ΔCth even after the specified period $t_1$ subsequent to calculation of the initial calibration value, the calibration processor 15 instructs the user to re-touch the touchscreen 3 and then monitors changes in the differential capacitance ΔC(t) generated by a user touch to determine whether or not the initial calibration value is anomalous. When the initial calibration value is determined to be anomalous, the calibration processor 15 calculates the recalibration value and recalibrates the detected capacitance C(t). In the present example, when the differential capacitance ΔC(t) generated by a user touch changes to be greater than the touch determination threshold value ΔCth subsequent to the re-touch instruction, the calibration processor 15 determines that the initial calibration value is acceptable and maintains the initial calibration value (that is, reference capacitance Cref). In contrast, when the differential capacitance ΔC(t) changes to be less than an anomaly determination threshold value ΔCth(err) subsequent to the instruction to re-touch, the calibration processor 15 determines that the initial calibration value is anomalous and recalibrates the detected capacitance C(t).

The operation and effects of the touch sensor device 4 will now be described with reference to FIGS. 4 and 5.

Figure 4:
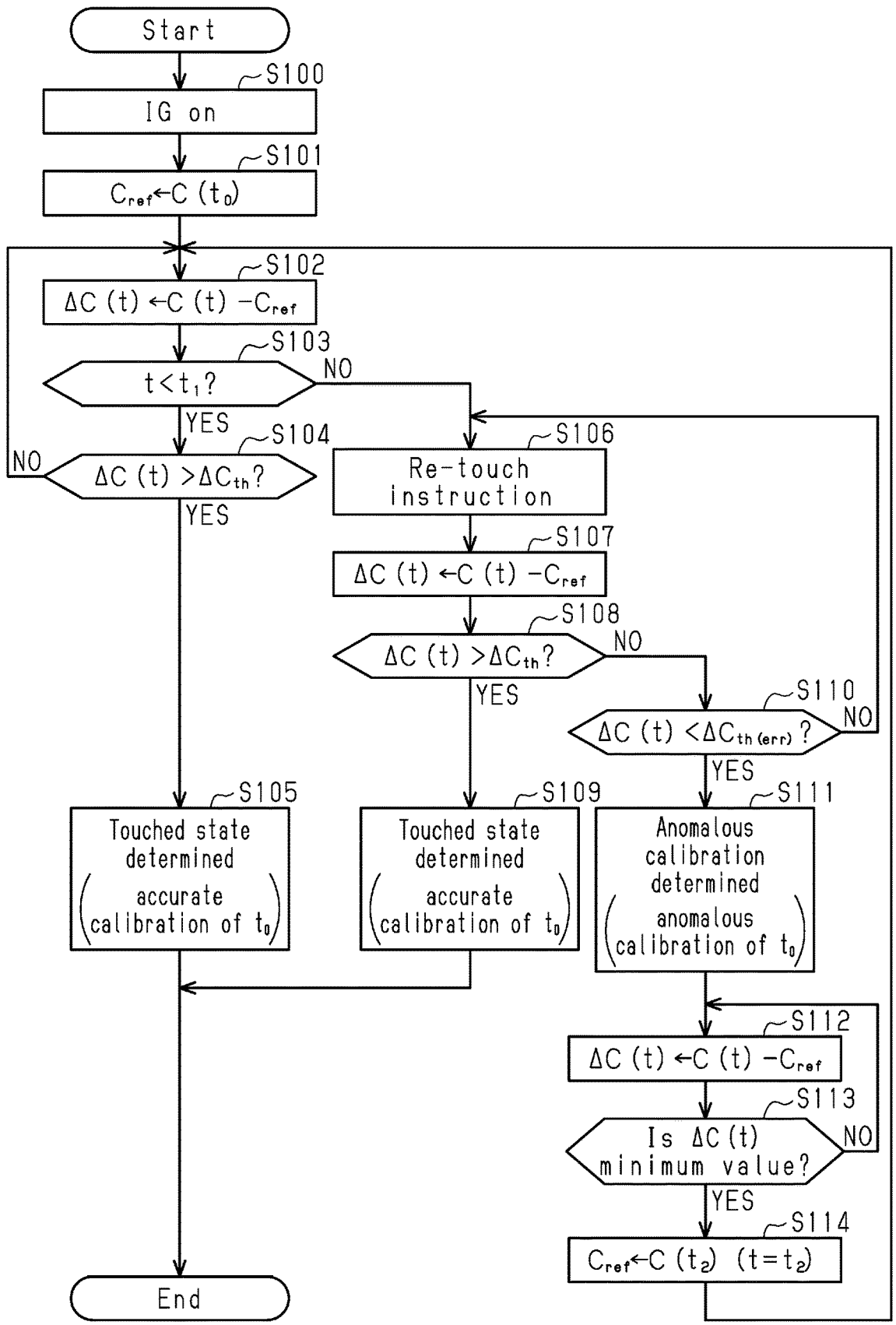
FIG. 4 is a flowchart illustrating a calibration process and a recalibration process on detected capacitance.

As illustrated in FIG. 4, in step S100, the device controller 10 receives an IG-on notification from the system 14 (in present example, in-vehicle system 2). In response to the IG-on notification, the device controller 10 activates the touch sensor device 4 that is in a standby state. For example, when the in-vehicle system 2 receives an IG-on signal from a power switch (engine switch, not illustrated), the IG-on notification is sent from the in-vehicle system 2 to the touch sensor device 4.

Further, in response to the IG-on signal, the in-vehicle system 2 requests the user to touch the touchscreen 3. The request may be issued, for example, through an audio notification using an in-vehicle speaker or through a visual notification using a display in an instrument panel. The touch request prompts the user to touch the touchscreen 3. However, in some cases, the user may not notice the touch request. In such a case, the touchscreen 3 will remain non-touched. In other cases, the IG may be turned on while the touchscreen 3 is being touched so the touched state continues when the touch sensor device 4 is activated.

In step S101, the calibration processor 15 obtains the detected capacitance $C(t_0)$ of each capacitance sensor 8 at time $t_0$ when the IG is turned on and the touch sensor device 4 is activated to set the detected capacitance $C(t_0)$ as the reference capacitance Cref. Step S101 corresponds to a step for calculating the initial calibration value.

In step S102, the calibration processor 15 subtracts the reference capacitance Cref from the present detected capacitance C(t) and obtains the differential capacitance ΔC(t). When the touch sensor device 4 is activated in the non-touched state, the reference capacitance Cref corresponds to the parasitic capacitance. In this case, the differential capacitance ΔC(t) obtained by subtracting the reference capacitance Cref from the detected capacitance C(t) of each capacitance sensor 8 indicates the change in capacitance from a calibration base line that is obtained when the parasitic capacitance is offset from the detected capacitance C(t) (for example, reference value "0") as illustrated in FIG. 2.

In step S103, the touch monitoring unit 18 determines whether or not an elapsed time t is equal to the specified period $t_1$. In other words, the touch monitoring unit 18 monitors the elapsed time t after the initial calibration value is calculated. When the elapsed time t is not equal to the specified period $t_1$ ($t<t_1$), the process proceeds to step S104. When the elapsed time t is equal to the specified period $t_1$ ($t \geq t_1$), the process proceeds to step S106.

In step S104, the touch monitoring unit 18 determines whether or not the differential capacitance ΔC(t) is greater than the touch determination threshold value ΔCth (that is, whether or not ΔC(t)>ΔCth is satisfied). That is, the touch monitoring unit 18 determines whether or not the touchscreen 3 is being touched after the initial calibration and before the elapsed time t becomes equal to the specified period $t_1$. When ΔC(t)>ΔCth is not satisfied, the process returns to step S102 and the touch monitoring unit 18 continues to monitor whether or not the user has touched the touchscreen 3. When $\Delta C(t) > \Delta Cth$ is satisfied, the process proceeds to step S105.

In step S105, the touch determination processor 11 determines that the touchscreen 3 is in a touched state. In this case, the calibration processor 15 determines that the reference capacitance Cref set by the detected capacitance $C(t_0)$, that is, the initial calibration value, is acceptable.

When the touchscreen 3 is not touched until the elapsed time t becomes equal to the specified period $t_1$, the re-touch request unit 19 generates a re-touch instruction requesting the user to re-touch the touchscreen 3 in step S106. The re-touch instruction may continue to be issued for a predetermined period or until the user re-touches the touchscreen 3. When the user notices the re-touch instruction, the user re-touches the touchscreen 3.

In step S107, the calibration processor 15 subtracts the reference capacitance Cref from the present detected capacitance C(t), which is obtained by the user touch subsequent to the re-touch instruction, to obtain the differential capacitance $\Delta C(t)$. That is, the calibration processor 15 calculates the differential capacitance $\Delta C(t)$ subsequent to the re-touch instruction.

In step S108, the touch monitoring unit 18 determines whether or not the differential capacitance $\Delta C(t)$, which was obtained subsequent to the re-touch instruction, is greater than the touch determination threshold value $\Delta Cth$ (that is, whether or not $\Delta C(t) > \Delta Cth$ is satisfied). When $\Delta C(t) > \Delta Cth$ is satisfied, the process proceeds to step S109. When $\Delta C(t) > \Delta Cth$ is not satisfied, the process proceeds to step S110.

In step S109, the touch determination processor 11 determines that the touchscreen 3 is in the touched state. In this case, the calibration processor 15 determines that the reference capacitance Cref set by the detected capacitance $C(t_0)$, that is, the initial calibration value, is acceptable. A situation under which the touched state is determined in step S109 occurs, for example, when the touch sensor device 4 is activated in a non-touched state and the initial calibration value was thereby suitably calculated but the user did not notice the touch request from the in-vehicle system 2 and the touchscreen 3 remained non-touched. In this case, the re-touch instruction will be issued as described above (S106). Then, when the user touches the touchscreen 3, each capacitance sensor 8 detects the change in capacitance generated by the user touch. The calibration processor 15 obtains the present detected capacitance C(t) from each capacitance sensor 8 and then obtains the differential capacitance $\Delta C(t)$ through calculation of C(t)-Cref (S107). Here, the reference capacitance Cref calculated as the initial calibration value (that is, $C(t_0)$) is an acceptable value. Thus, the differential capacitance $\Delta C(t)$ exceeds the touch determination threshold value $\Delta Cth$ (S108). Accordingly, the touch determination processor 11 detects the touched state (S109). In this case, the initial calibration value is maintained.

In step S110, when $\Delta C(t) > \Delta Cth$ is not satisfied even after the re-touch instruction is issued, the touch monitoring unit 18 determines whether or not the differential capacitance $\Delta C(t)$ represents an anomaly of the initial calibration value. In the present example, the touch monitoring unit 18 determines whether or not the differential capacitance $\Delta C(t)$ is less than the anomaly determination threshold value $\Delta Cth$(err).

Figure 5:
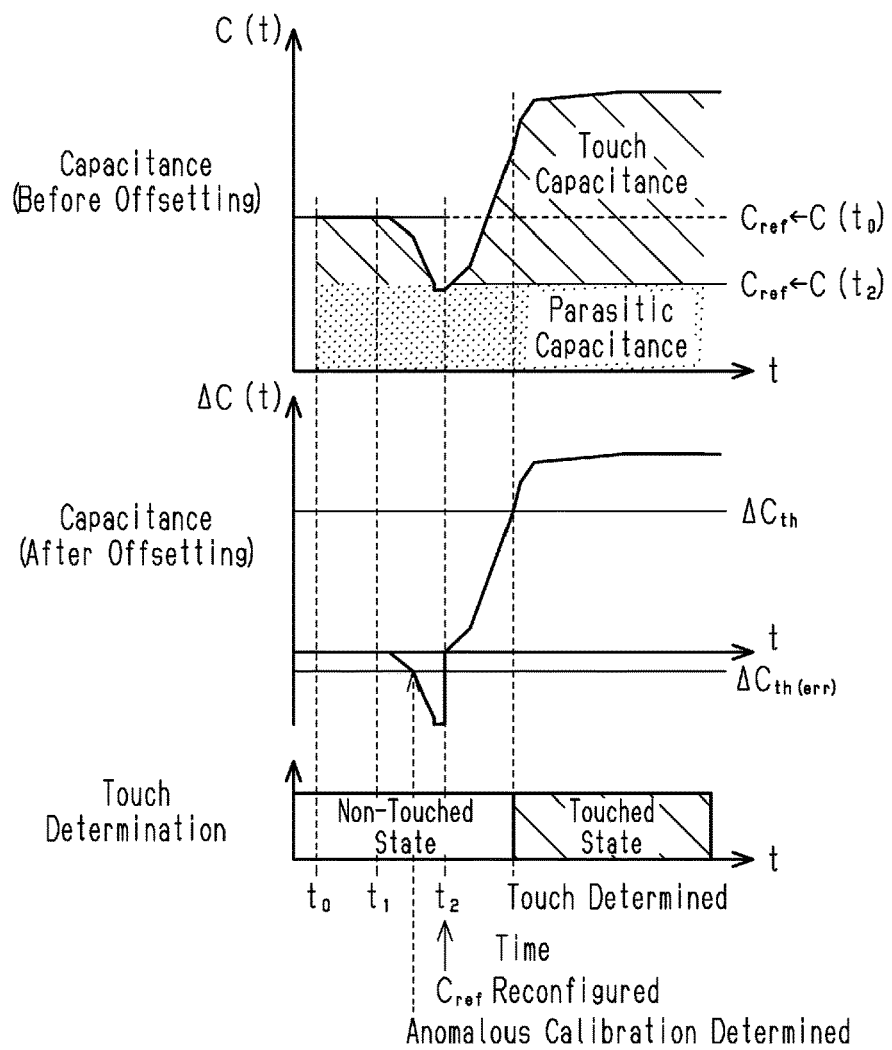
FIG. 5 is schematic diagram illustrating the recalibration process correlated with changes in detected capacitance (upper graph), changes in differential capacitance (middle graph), and the touch determination process (lower graph).

FIG. 5 illustrates changes in the capacitance in a case where the detected capacitance C(t) is calibrated in a touched state when the IG is turned on. At time $t_0$, the initial calibration value is calculated in the touched state. At time $t_1$, when a finger of the user (or part of human body or other conductive member) is separated from the touchscreen 3, the detected capacitance C(t) decreases. Accordingly, the differential capacitance $\Delta C(t)$ also decreases. Then, when the touchscreen 3 is touched again at time t2, the detected capacitance C(t) increases. In this manner, when the touchscreen 3 is touched again after the initial calibration value is calculated in the touched state, the detected capacitance C(t) temporarily decreases and then increases. Thus, when the touch monitoring unit 18 detects that the differential capacitance $\Delta C(t)$ is less than the anomaly determination threshold value $\Delta Cth$(err) subsequent to the re-touch instruction, the calibration processor 15 determines that the initial calibration value is anomalous.

With reference to FIG. 4, when the differential capacitance $\Delta C(t)$ is less than the anomaly determination threshold value $\Delta Cth$(err) (YES in S110), the process proceeds to step S111. When the differential capacitance $\Delta C(t)$ is not less than the anomaly determination threshold value $\Delta Cth$(err) (NO in S110), the process returns to step S106 and the re-touch instruction is repeatedly issued.

In step S111, the calibration processor 15 determines that the reference capacitance Cref set by the detected capacitance $C(t_0)$ is erroneous, that is, the initial calibration value is anomalous. The process proceeds to step S112.

In step S112, the calibration processor 15 obtains the differential capacitance $\Delta C(t)$ again by subtracting the reference capacitance Cref from the present detected capacitance C(t). That is, after the initial calibration value is determined to be anomalous, the calibration processor 15 calculates a new differential capacitance $\Delta C(t)$.

In step S113, the calibration processor 15 determines whether or not the newly calculated differential capacitance $\Delta C(t)$ includes a minimum value. This determination process may employ any determination logic configured to determine a minimum value. For example, the minimum value may be determined using an estimated value of the parasitic capacitance. When the calibration processor 15 has determined that the differential capacitance $\Delta C(t)$ includes the minimum value, the process proceeds to step S114. When the differential capacitance $\Delta C(t)$ does not include the minimum value, the process proceeds to step S112 to obtain the differential capacitance $\Delta C(t)$ again.

When determining that the differential capacitance $\Delta C(t)$ includes the minimum value, the calibration processor 15 reconfigures the reference capacitance Cref in step S114. That is, the calibration processor 15 calculates the recalibration value. In the present example, the calibration processor 15 sets the detected capacitance C(t), which is obtained when the differential capacitance $\Delta C(t)$ has been determined to include the minimum value, as a new reference capacitance Cref and recalibrates the detected capacitance C(t) with the new reference capacitance Cref. For example, as illustrated by the middle graph in FIG. 5, the differential capacitance $\Delta C(t)$ becomes equal to the minimum value at time t2. In this case, the calibration processor 15 obtains a detected capacitance $C(t_2)$ at time t2 and sets the detected capacitance $C(t_2)$ as the new reference capacitance Cref (refer to upper graph in FIG. 5). The detected capacitance $C(t_2)$ corresponds to the minimum value of the detected capacitance C(t) that changes when the user re-touches the touchscreen 3. In this case, the new reference capacitance Cref does not have to be set to the minimum value of the detected capacitance C(t) and may be set, for example, to a value approximate to the minimum value of the detected capacitance C(t). Then, the calibration processor 15 sets time $t_2$ as time $t_0$ and continues the touch determination process.

When an initial calibration is performed in a touched state, the user may re-touch the touchscreen 3 in response to the touch request from the in-vehicle system 2 before the elapsed time t becomes equal to the specified period $t_1$. However, in this case, even when the touchscreen 3 is re-touched, the differential capacitance ΔC(t) will not exceed the touch determination threshold value ΔCth, and the touch determination processor 11 will not detect the touched state (refer to FIG. 3). Thus, when the elapsed time t becomes equal to the specified period $t_1$, the process proceeds to step S106. Thereafter, as described above, the initial calibration value will be determined as anomalous (S111), and the detected capacitance C(t) will be recalibrated (S114).

The touch sensor device 4 described above includes a memory (not illustrated) that stores one or more programs including instructions to execute the calibration process and recalibration process, which are illustrated in FIG. 4, with the device controller 10. For example, the device controller 10 includes one or more processors and executes the calibration process and recalibration process, which are illustrated in FIG. 4, in accordance with the programs stored in the memory. Such programs may be provided as a non-transitory machine readable memory medium that stores the programs.

In the above embodiment, multiple functions accomplished by the device controller 10 are divided into function blocks of the touch determination processor 11, the calibration processor 15, the touch monitoring unit 18, and the re-touch request unit 19. However, the function blocks may be divided into a larger number of function blocks. Alternatively, two or more function blocks may be merged.

The present embodiment has the advantages as described below.

(1) When the differential capacitance ΔC(t) does not exceed the touch determination threshold value ΔCth after the initial calibration value of the detected capacitance C(t) is calculated and before the elapsed time t becomes equal to the specified period $t_1$, there is a possibility that the initial calibration value was calculated while the touchscreen 3 was in a touched state. Accordingly, the touch sensor device 4 monitors changes in the differential capacitance ΔC(t) generated when the user re-touches the touchscreen 3 after the specified period $t_1$ to determine whether or not the initial calibration value is anomalous. Subsequently, when the initial calibration value is determined as being anomalous, the touch sensor device 4 recalibrates the detected capacitance C(t). In this manner, even when the initial calibration value is calculated while the touchscreen 3 is in a touched state, the detected capacitance C(t) is recalibrated. This accurately calibrates the detected capacitance C(t).

(2) The touch sensor device 4 includes the re-touch request unit 19 that requests the user to re-touch the touchscreen 3 when a touched state is not determined after the initial calibration value is calculated before the elapsed time t becomes equal the specified period $t_1$. This prompts the user to re-touch the touchscreen 3.

(3) If the differential capacitance ΔC(t) generated when the user re-touches the touchscreen 3 changes to a value greater than the touch determination threshold value ΔCth, the calibration processor 15 maintains the reference capacitance Cref, which is calculated as the initial calibration value. That is, the calibration processor 15 determines that the initial calibration value is an acceptable value that was obtained in a non-touched state. This avoids unnecessary recalibrations.

(4) If the differential capacitance ΔC(t) generated when the user re-touches the touchscreen 3 changes to a value less than the anomaly determination threshold value ΔCth(err), the calibration processor 15 determines that the initial calibration value is anomalous. That is, the calibration processor 15 determines that the initial calibration value was calculated in the touched state and that the touchscreen 3 was subsequently re-touched. In this case, the calibration processor 15 recalibrates the detected capacitance C(t). Thus, even when the initial calibration value is anomalous, the detected capacitance C(t) is accurately recalibrated.

It should be apparent to those skilled in the art that the foregoing embodiments may be implemented in many other specific forms without departing from the scope of this disclosure. Particularly, it should be understood that the foregoing embodiments may be implemented in the following forms.

The following modifications and the above embodiment may be combined as long as the combined modifications remain technically consistent with each other.

Figure 6:
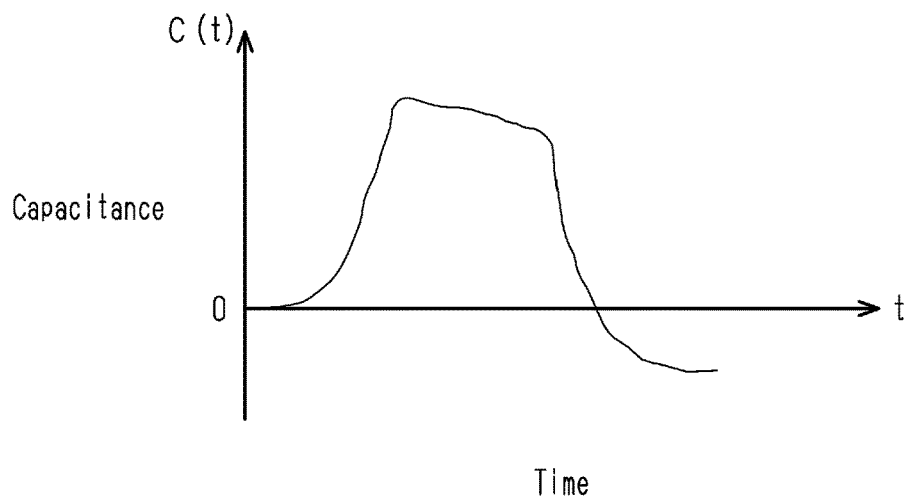
FIG. 6 is a waveform illustrating a recalibration process (change in capacitance) of another example.

The logic of the recalibration of the detected capacitance C(t) may be applied to cases other than when the parasitic capacitance increases. For example, as illustrated in FIG. 6, the recalibration logic may also be applied when the parasitic capacitance decreases.

The system 14 (in the present example, the in-vehicle system 2) may be activated not only when the IG of the vehicle 1 is turned on but also at any time such as when a vehicle door is opened or closed or when a user is seated on a vehicle seat.

The touch sensor device 4 and the system 14 (in the present example, the in-vehicle system 2) do not have to be activated concurrently. The touch sensor device 4 may be activated at a time that differs from when the system 14 is activated.

The touch request may be issued at any time after the activation of the touch sensor device 4.

The initial calibration value does not have to be calculated when the IG is turned on. For example, the initial calibration value may be calculated at other times such as when detecting that a vehicle door has been unlocked and that the user is entering the vehicle.

The request for the user to re-touch (re-touch request) the touchscreen 3 does not have to be issued by an in-vehicle device and may be issued by a portable terminal such as a smart phone.

The re-touch request unit that requests the user to re-touch the touchscreen 3 may be omitted.

The touch determination threshold value ΔCth may be set to differ from a threshold value for determination of a non-touched state (non-touched determination threshold value). Alternatively, the touch determination threshold value ΔCth may be set to be equal to the threshold value.

The touch determination threshold value ΔCth is set in accordance with the design and application of the touch sensor device 4. For example, the touch determination threshold value ΔCth may be set to be greater than a floor noise value (capacitance generated by floor noise) and less than or equal to an estimated minimum capacitance for determination of the touched state.

The anomaly determination threshold value ΔCth(err) is set in accordance with the design and application of the touch sensor device 4. For example, the anomaly determination threshold value $\Delta Cth(err)$ may be set to be less than the floor noise value.

The capacitance sensors 8 do not have to increase the output value when the touchscreen 3 is touched and may decrease the output value when the touchscreen 3 is touched.

The vehicle 1 may be a self-driving vehicle.

The touch sensor device 4 may be applied to any device such as an in-vehicle touch panel.

The system 14 that uses the touch sensor device 4 is not limited to a vehicle system such as the in-vehicle system 2, and may be used in any system.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to an illustration of the superiority and inferiority of the invention. Although embodiments have been described in detail, it should be understood that various changes, substitutions, and alterations could be made hereto without departing from the scope of this disclosure.

What is claimed is:

1. A touch sensor device, comprising:
    a plurality of capacitance sensors;
    a calibration processor that calibrates capacitance detected by each of the capacitance sensors and calculates a calibrated capacitance; and
    a touch monitoring unit that monitors whether the calibrated capacitance exceeds a touch determination threshold value,
    wherein the calibration processor
        calculates an initial calibration value when the touch sensor device is activated,
        maintains the initial calibration value when the calibrated capacitance that is calculated with the initial calibration value exceeds the touch determination threshold value,
        determines whether the calibrated capacitance changed by a re-touch represents an anomaly of the initial calibration value when the calibrated capacitance calculated with the initial calibration value does not exceed the touch determination threshold value even after a specified period elapses subsequent to calculation of the initial calibration value, and
        obtains a value equal to or approximate to a minimum value of the capacitance that changes in accordance with the re-touch as a recalibration value when the calibrated capacitance represents the anomaly of the initial calibration value.

2. The touch sensor device according to claim 1 further comprising a re-touch request unit that requests a user to perform the re-touch when the calibrated capacitance does not exceed the touch determination threshold value even after the specified period elapses subsequent to calculation of the initial calibration value.

3. The touch sensor device according to claim 1, wherein when the calibrated capacitance changed by the re-touch exceeds the touch determination threshold value, the calibration processor determines that the initial calibration value is accurate and maintains the initial calibration value.

4. The touch sensor device according to claim 1, wherein when the calibrated capacitance changed by the re-touch becomes less than an anomaly determination threshold value, the calibration processor determines that the initial calibration value is anomalous and obtains the recalibration value.

5. A method for calibrating capacitance of each of a plurality of capacitance sensors arranged in a touch sensor device, the method comprising:
    calculating an initial calibration value when the touch sensor device is activated;
    calculating a calibrated capacitance by calibrating the capacitance with the initial calibration value;
    maintaining the initial calibration value when the calibrated capacitance calculated with the initial calibration value exceeds the touch determination threshold value;
    determining whether the calibrated capacitance changed by a re-touch represents an anomaly of the initial calibration value when the calibrated capacitance calculated with the initial calibration value does not exceed the touch determination threshold value even after a specified period elapses subsequent to calculation of the initial calibration value; and
    obtaining a value equal to or approximate to a minimum value of the capacitance that changes in accordance with the re-touch as a recalibration value when the calibrated capacitance represents the anomaly of the initial calibration value.

6. A non-transitory machine readable memory medium that stores one or more programs executed by one or more processors, the one or more programs comprising instructions causing the one or more processors to execute the method of claim 5.

* * * * *